(12) United States Patent
Soliman

(10) Patent No.: US 11,951,443 B2
(45) Date of Patent: Apr. 9, 2024

(54) SYSTEM AND METHOD FOR SEPARATING AND RECOVERING GAS FIELD CHEMICALS FROM WASTEWATER

(71) Applicant: SAUDI ARABIAN OIL COMPANY, Dhahran (SA)

(72) Inventor: Mohamed A. Soliman, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 17 days.

(21) Appl. No.: 17/712,296

(22) Filed: Apr. 4, 2022

(65) Prior Publication Data

US 2023/0311065 A1 Oct. 5, 2023

(51) Int. Cl.
| | |
|---|---|
| *E21B 43/20* | (2006.01) |
| *B01D 3/10* | (2006.01) |
| *B01D 17/02* | (2006.01) |
| *B01D 17/04* | (2006.01) |
| *B01D 61/00* | (2006.01) |
| *C02F 9/00* | (2023.01) |
| *C02F 1/04* | (2023.01) |

(Continued)

(52) U.S. Cl.
CPC ............. *B01D 61/002* (2013.01); *B01D 3/10* (2013.01); *B01D 17/0205* (2013.01); *B01D 17/047* (2013.01); *C02F 9/00* (2013.01); *E21B 43/20* (2013.01); *B01D 2311/2669* (2013.01); *B01D 2315/04* (2013.01); *C02F 1/04* (2013.01); *C02F 1/24* (2013.01); *C02F 1/26* (2013.01); *C02F 1/445* (2013.01); *C02F 2101/32* (2013.01); *C02F 2103/10* (2013.01); *C02F 2303/16* (2013.01)

(58) Field of Classification Search
CPC .......... E21B 43/20; E21B 43/34; E21B 43/40; B01D 3/10; B01D 17/0205; B01D 17/047; B01D 61/002; B01D 2311/2669; C02F 9/00; C02F 1/04; C02F 1/24; C02F 1/26; C02F 1/445; C02F 2101/32; C02F 2103/10; C02F 2303/16
See application file for complete search history.

(56) References Cited

U.S. PATENT DOCUMENTS

| | | | |
|---|---|---|---|
| 7,901,578 B2* | 3/2011 | Pruet | C02F 1/441 |
| | | | 210/257.2 |
| 7,994,374 B2 | 8/2011 | Talley et al. | |

(Continued)

FOREIGN PATENT DOCUMENTS

| | | |
|---|---|---|
| WO | 2012148911 A2 | 11/2012 |
| WO | 2013121217 A2 | 8/2013 |

(Continued)

*Primary Examiner* — Matthew R Buck
(74) *Attorney, Agent, or Firm* — Osha Bergman Watanabe & Burton LLP

(57) ABSTRACT

Described is a method for concentration and extraction of gas field chemicals. The method includes collecting produced water from a gas oil separation plant, treating the produced water to remove oil, and receiving a feed solution containing a gas field chemical and water. The treated produced water is used as a draw solution to concentrate and absorb water from the feed solution using a forward osmosis chamber. A concentrated feed solution containing the gas field chemical and a diluted draw solution is produced. The concentrated feed solution is extracted and stored for injection into gas wells.

17 Claims, 8 Drawing Sheets

(51) Int. Cl.
*C02F 1/24* (2023.01)
*C02F 1/26* (2023.01)
*C02F 1/44* (2023.01)
*C02F 101/32* (2006.01)
*C02F 103/10* (2006.01)

(56) References Cited

U.S. PATENT DOCUMENTS

| | | | |
|---|---|---|---|
| 8,728,325 | B2 | 5/2014 | Hussain et al. |
| 8,980,798 | B2 | 3/2015 | Tian et al. |
| 2010/0224561 | A1* | 9/2010 | Marcin ............... B01D 61/025 210/209 |
| 2013/0168315 | A1 | 7/2013 | Minier Matar et al. |
| 2018/0370834 | A1* | 12/2018 | Sutton-Sharp ......... B01D 61/58 |
| 2019/0118114 | A1 | 4/2019 | Rithauddeen et al. |
| 2019/0263685 | A1* | 8/2019 | Bhuwania ............ B01D 61/002 |

FOREIGN PATENT DOCUMENTS

| | | | | |
|---|---|---|---|---|
| WO | WO-2013136310 | A1 * | 9/2013 | ......... B01D 53/1406 |
| WO | 2014089228 | A2 | 6/2014 | |
| WO | 2014126925 | A1 | 8/2014 | |
| WO | WO-2022129044 | A1 * | 6/2022 | |

\* cited by examiner

SYSTEM AND METHOD FOR SEPARATING AND RECOVERING GAS FIELD CHEMICALS FROM WASTEWATER

BACKGROUND

Oil and gas companies operate facilities, such as gas-oil separation plants (GOSPs), that process fluids composed of gas and produced water in addition to crude oil. One of the primary functions of a GOSP is to separate gas and water from raw crude oil to produce dry crude oil. Various wells at a GOSP may produce a gas-liquid mixture that passes through one or more separators to remove gas and water from crude oil. For example, a GOSP may separate the natural gas materials at this stage for transportation accordingly.

Natural gas hydrates are ice-like crystalline forms of water and low molecular weight gas (e.g., methane, ethane, propane, carbon dioxide, isobutane, $H_2S$, $CO_2$, nitrogen). Gas hydrates form when water and gas combine under high pressure and at moderate temperatures. In the oil and gas industry, gas hydrates can accumulate on inner walls of pipes or fluid receptacles. The accumulation of the gas hydrates blocks the flow of fluid and leads to the accumulation of unwanted material on surfaces in a manner that impedes, or interferes with, a function of the surface of a component, system, or plant. This type of accumulation is referred to as fouling. Hydrate formation is a significant operational and safety concern, as hydrates can reduce production rates, plug transmission pipelines or form ice balls that can act as solid projectiles damaging the downstream instruments and processes.

Kinetic hydrate inhibitors (KHIs) are polymeric-based chemicals that are typically used to inhibit natural gas hydrate formation. KHIs inhibit the formation of hydrates by slowing the nucleation or growth of hydrate crystals. Treating a fluid stream with KHI, thus, enables fluid streams to pass along a flow path with reduced hydrate formation. Most high-performance KHIs have solubility limitations based on temperature and salt content of the water. They become less soluble and can even precipitate at higher temperatures and salt content. This is a problem because KHI precipitates can form at valves, pumps, and heat exchangers inside a gas oil separation plant. Furthermore, other chemicals in a gas plant, particularly corrosion inhibitors, can impact KHI.

Various methods have been utilized to separate and recover KHIs from aqueous fluids; however, these existing methods result in high energy consumption, high membrane fouling, and long residence time for separation. Thus, a continuing need exists for a system and method which can be utilized to reduce the precipitation of KHIs, and other gas field chemicals, while also recovering the chemicals in an energy-efficient manner.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for separating gas field chemicals from a feed stream. The method includes providing a forward osmosis chamber having a forward osmosis membrane and feeding a draw stream of high salinity produced water to the forward osmosis chamber. The feed stream, comprising condensed water vapor from a gas well containing kinetic hydrate inhibitor (KHI), is also fed to the forward osmosis chamber. Pure water is osmotically separated from the feed stream, and a concentrated feed stream of KHI is obtained from the forward osmosis chamber. A diluted draw stream of produced water from the forward osmosis chamber.

In another aspect, embodiments described herein relate to a method for concentration and extraction of gas field chemicals. The method includes collecting produced water from a gas oil separation plant, treating the produced water in a water oil separation plant to remove oil; and receiving a feed solution passed through a three-phase separator and a filter, the feed solution comprising a gas field chemical and water. The treated produced water is used as a draw solution to concentrate and absorb water from the feed solution using a forward osmosis chamber, thereby producing a concentrated feed solution containing the gas field chemical and a diluted draw solution. The concentrated feed solution containing the gas field chemical is then extracted.

In another aspect, embodiments described herein relate to a system for concentration and extraction of gas field chemicals. The system includes a gas oil separation plant configured for producing water from a crude feed; a water oil separation plant configured for removing oil from the produced water; a three-phase separator and a filter for configured for producing a feed solution comprising a gas field chemical and water; a forward osmosis chamber configured for concentrating and absorbing water from the feed solution using the treated produced water as a draw solution, thereby producing a concentrated feed solution containing the gas field chemical; and a chemical storage unit for storing the concentrated feed solution containing the gas field chemical.

Other aspects and advantages of the claimed subject matter will be apparent from the following description and the appended claims.

DETAILED DESCRIPTION

Figure 1:
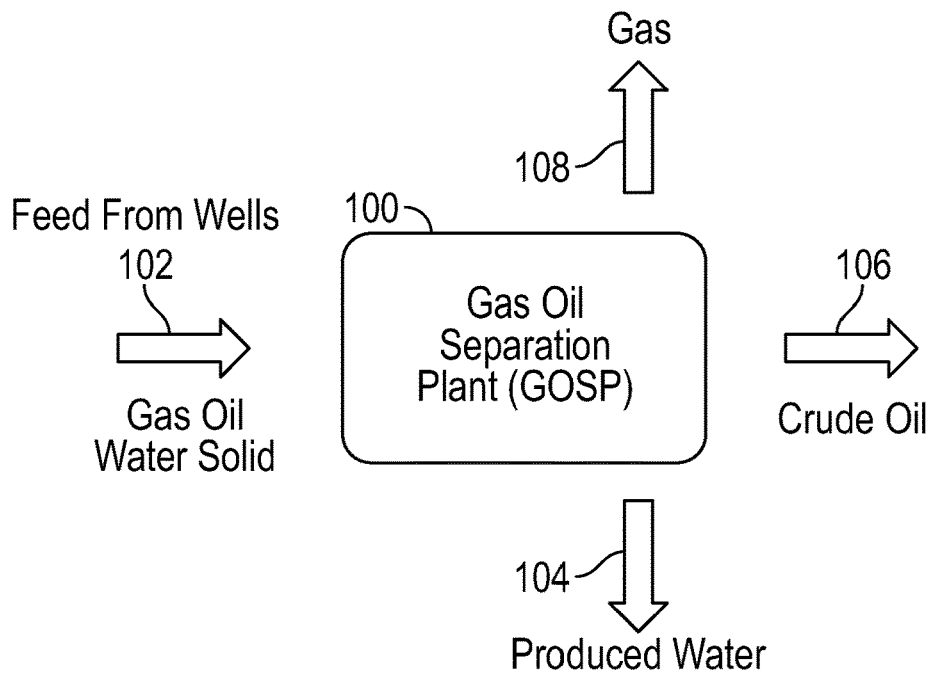
FIG. 1 illustrates inputs and output of a gas oil separation plant (GOSP) in accordance with one or more embodiments of the present invention.

In the following detailed description of embodiment of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Described herein are systems and methods which utilize high salinity gas-oil separation plants (GOSP) formation water from adjacent crude oil high pressure production traps (HPPT), low pressure production traps (LPPT), low pressure degassing tanks (LPDT), and dehydrators to extract pure water from the condensed water vapor in the gas pipelines containing gas field chemicals. The gas field chemicals include kinetic hydrate inhibitors (KHI) and a corrosion inhibitor. The extraction of water from the condensed water vapor in the gas pipelines concentrates the KHIs. In one embodiment of the invention, this process is accomplished using a forward osmosis (FO) membrane. In another embodiment of the invention, the process is accomplished using a vibrationally assisted FO membrane to reduce fouling.

One or more embodiments of the present disclosure generally relate to methods and systems for removal of gas field chemicals from produced and process water. Embodiments of the present disclosure also include methods and systems for treating produced water using processes that include forward osmosis to separate and concentrate gas field chemicals of the produced water.

In one aspect, embodiments disclosed herein relate to methods and systems for separating high valuable gas field chemicals, such as kinetic hydrate inhibitors (KHI) and corrosion inhibitors (CI), from condensed water vapor. KHIs are polymeric-based chemicals that can be used to inhibit natural gas hydrate formation.

In one or more embodiments, the recovered KHI can be recycled back for reinjection/reuse at the wellhead to minimize fresh gas field chemicals and KHI requirements.

The systems and processes described herein utilize forward osmosis (FO) to first concentrate the KHI to a desired limit. In some embodiments, additional steps may be provided which utilize heating and/or secondary inorganic/organic compounds to enhance the separation of KHI from the produced water.

In one or more embodiments, the feed solution to a FO chamber may be high salinity formation water associated with the crude or recyclable regenerative solutions, such as ammonium chloride. The separation of KHI and/or corrosion inhibitors can be accomplished by utilizing FO, specifically relying upon the osmotic pressure differential between the very high salinity produced water and condensed water from gas streams. Thus, FO can be employed to recover chemicals and safely dispose of the gas-filled associated water.

In some embodiments, vibration-assisted forward osmosis (VAFO) may be used for reducing membrane fouling. In such embodiments, VAFO produces shear waves that prevent potential stagnation and fouling of the membrane. The present disclosure relies upon the high osmotic pressure of produced water to concentrate the gas field chemicals and utilizes the produced low salinity power water injection requirement for enhanced oil recovery.

In one or more embodiments, the produced water can include produced water from a subterranean formation. For example, the aqueous solution can be wastewater which may include brine. A brine solution may be any aqueous solution with a mixture of salts, including inorganic salts such as carbonates and sulfates of various metals, i.e., calcium, strontium and barium as well as complex salts of iron such as sulfides, hydrous oxides and carbonates. Although salt compositions may vary, some typical ions dissolved in brine include sodium (Na), potassium (K), magnesium (Mg), calcium (Ca), strontium (Sr), barium (Ba), iron (Fe), chloride (Cl), bromide (Br), sulfate ($SO_4$), and bicarbonate ($HCO_3$). Brines can come from a variety of locations, including various production wells and ocean water. The brine solution composition will vary greatly dependent upon the reservoir being produced and the treatment being applied to the reservoir, and additionally, conditions will vary over time.

(1) Introduction (1.1) Forward Osmosis (FO)

Generally, osmosis is the molecular diffusion of a solvent across a semi-permeable membrane where diffusion is driven by a chemical potential gradient. The chemical potential gradient is the result of differences in respective constituent concentration, pressure and/or temperature across the membrane. In FO, the water in a low-concentration solution permeates and moves through a semi-permeable membrane toward a higher-concentration (high osmotic pressure) solution, such as produced water, in one or more embodiments of the present disclosure. FO membranes of the present disclosure are not particularly limited and can include those that are commercially available such as the FO membranes from Hydration Technology Innovations (HTI), Lenntech or other suppliers.

The osmotic pressure is the minimum pressure which needs to be applied to a solution to prevent the inward flow of its pure solvent across the semi-permeable membrane. For an ideal solution, the relationship between the osmotic pressure of a solution and the molar concentration of its ions is:

$$\pi = CRT$$

where $\pi$ is the osmotic pressure, C is the molar concentration of the ions in the solution in mol/liter, R is the universal gas constant (i.e., 0.08206 L atm mol-1 K-1), and T is the temperature on the Kelvin scale.

For the flux, water transport through the membrane is a function of differential pressure, and can be determined as follows:

$$JW = KW(\Delta P - \Delta \pi),$$

where JW denotes the rate of water passage through the membrane, KW is the permeability coefficient for water for a particular membrane (area and thickness are included), $\Delta P$ is the hydraulic pressure differential, and $\Delta \pi$ represents the osmotic pressure differential.

(1.2) Vibrationally Assisted Forward Osmosis (FO)

In one or more embodiments of the present disclosure, vibration assisted membranes will reduce fouling in forward osmosis. The shear stress is normally generated on the membrane surface when the membranes are vibrating using various components, such as rotating disks, vibrating flat sheet membranes, and vibrating hollow fibers based on a Vibratory Shear Enhanced Process (VSEP) vendor. Additionally, the application of shear stress on the membrane can be utilized as a strategy to induce a boundary layer disturbance for mitigating concentration polarization effects and controlling fouling. A boundary layer in this context is a layer of fluid in close proximity to a bounding surface, where the effects of viscosity are significant. In other words, the liquid or gas in the boundary layer tends to cling to the surface.

The semi-permeable membrane is characterized by having small pores such that water molecules can pass freely, while the passage of solute molecules is hindered or stopped, such that the solute molecules do not pass through. The semi-permeable membrane of the vibrationally assisted FO unit, or chamber, can be selected from a flat membrane, a spiral wound membrane, a tubular membrane, or any combination thereof. The tubular membrane can have a cross section selected from one of circular, square, rectangular, and triangular. The tubular membrane can also include hollow membranes. In at least one embodiment, the semipermeable membrane is a spiral wound membrane. In at least one embodiment, the semipermeable membrane is a tubular membrane containing hollow fibers.

The semipermeable membrane can be constructed from organic materials, mineral materials, or ceramic materials. Non-limiting examples of organic materials include cellulose acetate, cellulose nitrate, polysulfone, polyvinylidene fluoride, polyamide and acrylonitrile copolymers. Non-limiting examples of mineral and ceramic materials include C—Al—O, ZrO, $TiO_2$, or a mixed oxide of SiO, and Al—O or $ZrO_2$. The semipermeable membranes can be composites of organic materials and mineral or ceramic materials. The semipermeable membranes can be designed for the specific application they are to be used for in light of the solids and other contaminants in the water. The semipermeable membrane can include a feed side and a draw side.

(1.3) Gas-Oil Separation Plant (GOSP) Equipment

FIG. 1 is a schematic diagram of inputs and outputs of an embodiment of a gas-oil separation plant (GOSP) (100). In use, the GOSP (100) is connected to a wellhead after a choke valve in order to receive the feed from the wells (102). The feed (102) comprises a combination of gas, oil, water, and solids, such as sand and dirt. During separation, the fluids separate by gravity. The solids settle to the bottom of a separator vessel, or chamber, of the GOSP (100). Produced water (104) and crude oil (106) are drawn separately, and vapor, or gas (108) separates and exits to the top of the separator vessel for withdrawal. The three fluid phases, (gas (108), crude oil (106), and produced water (104), can then be monitored to determine the relative flow-rates of the components and production potential of the well.

Figure 2:
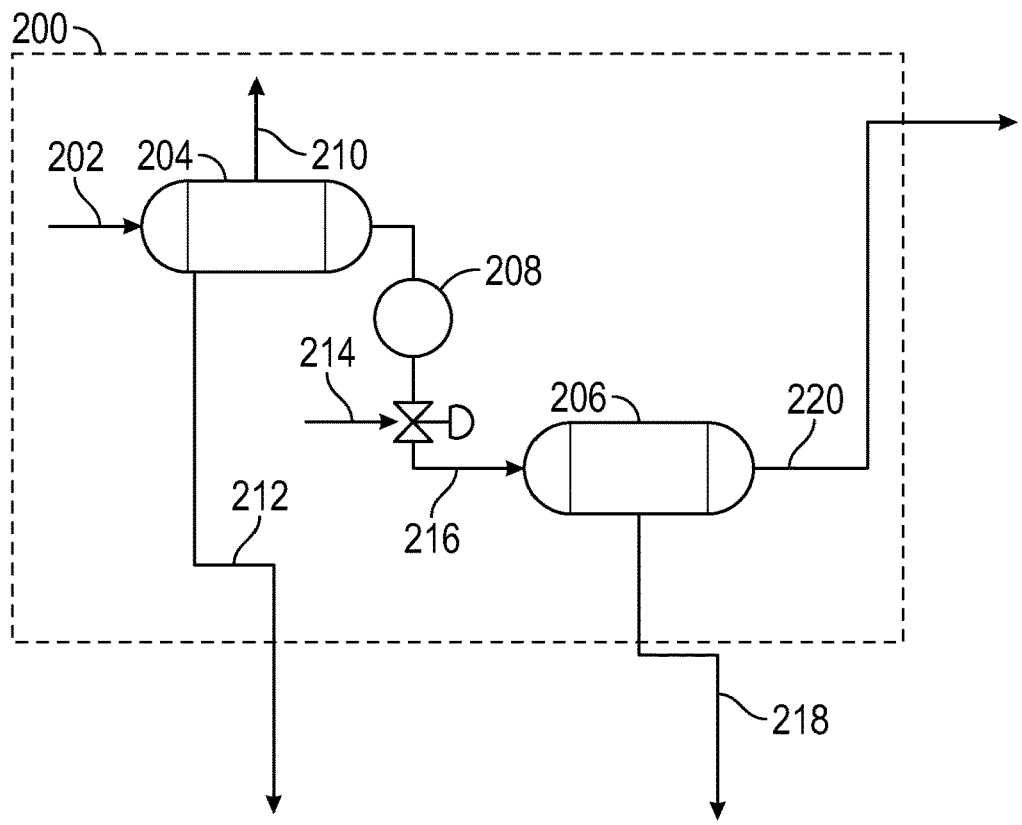
FIG. 2 is a schematic diagram illustrating a GOSP in accordance with one or more embodiments of the present disclosure.

FIG. 2 illustrates an example of gas oil separation plant (GOSP) equipment (200) for extracting pure water from condensed water vapor in the gas pipelines containing the gas field chemicals, such as KHI and corrosion inhibitor. A GOSP uses one or more pressure vessels for separating well fluids into gaseous and liquid components. The well fluids at the wellhead are at a significantly high pressure; reducing this pressure allows separation of liquid and gas components from a crude oil feed stream (202) received from a wellhead. The GOSP equipment (200) may include a low-pressure production trap (LPPT) (204), a dehydrator unit (206), and a heating unit (208) all in fluid communication with one another via multiple pipelines. The LPPT (204) receives the crude oil feed stream (202) from the wellhead and extracts a vapor component (210) and an oil and water component (212) based on a drop in pressure. The resulting crude oil travels to the heating unit (208) where it is heated and then mixed with wash water (214). The crude oil and wash water mixture (216) proceeds to the dehydrator unit (206). The dehydrator unit (206) extracts pure water (218) from the mixture, leaving behind recovered crude oil (220), which can be transported for further treatment and processing.

The gas phase, which can include light hydrocarbons such as, but not limited to, methane, ethane, propane, butane, or other light hydrocarbons, and gases such as carbon dioxide, nitrogen, or water vapor, exits the separator vessel of the GOSP (100). The condensate phase, which can include heavier hydrocarbons including, but not limited to, aromatics, resins, and/or other heavier hydrocarbons, also exits the separator vessel of the GOSP. The gas and condensate phases are processed as appropriate, for example, for consumption, sale, or disposal. The oil and water component (212), which includes condensed water vapor and KHI and/or CI, exits the LPPT (204). Because KHI polymers are generally water soluble, the oil and water component (212) contains most or all of the KHI originally present in the crude oil feed stream (202). Accordingly, the gas phase and hydrocarbon phase contain little or no KHI.

In one or more embodiments, the operating pressure and temperature ranges for GOSP equipment are the following:

|  | Pressure Range (PSIG) | Temperature Range (° F.) |
| --- | --- | --- |
| LPPT | 35-90 | 70-150 |
| Dehydrators | 40-200 | 70-170 |
| WOSEP | 35-70 | 70-150 |
| Discharge of High Pressure Disposal water Pumps | 2000-3200 | 70-150 |
| KHI & Chemical Storage | 0-5 | 60-120 |
| Feed Solution | 5-200 | 60-120 |
| Draw Solution | 5-200 | 70-150 |

As can be appreciated by one skilled in the art, these ranges are only provided as examples of operating pressures and temperatures and are not intended to be limiting.

(1.4) Produced Water

The produced high salinity water draw solution (104) may have a total dissolved solid (TDS) content of at least 100,000 parts per million (ppm). In one or more embodiments, the TDS of the produced high salinity water may range from 125,000 to 280,000 ppm. The produced high salinity water draw solution may have an osmotic pressure that ranges from 1,700 to 4,100 pounds per square inch, gauge (PSIG) at 170° F. Additionally, the produced high salinity water draw solution, collected from various GOSP equipment, may be treated in a water-oil separation plant to remove oil content to less than 100 ppm.

The produced high salinity water draw solution may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc. In some embodiments, an ammonia and carbon dioxide draw solution may be used alone or in combination with the above listed salts and other ionic species.

(1.5) Condensed Water Vapor

The condensed water vapor feed solution may have a total dissolved solid (TDS) content of at least 0.1 ppm. In one or more embodiments, the TDS of the condensed water vapor feed solution may range from 125,000 to 280,000 ppm. The condensed water vapor comprises KHI and CIs. The condensed water vapor feed solution may have an osmotic pressure that ranges from 1,700 to 4,100 PSIG at 170° F.

Figure 3:
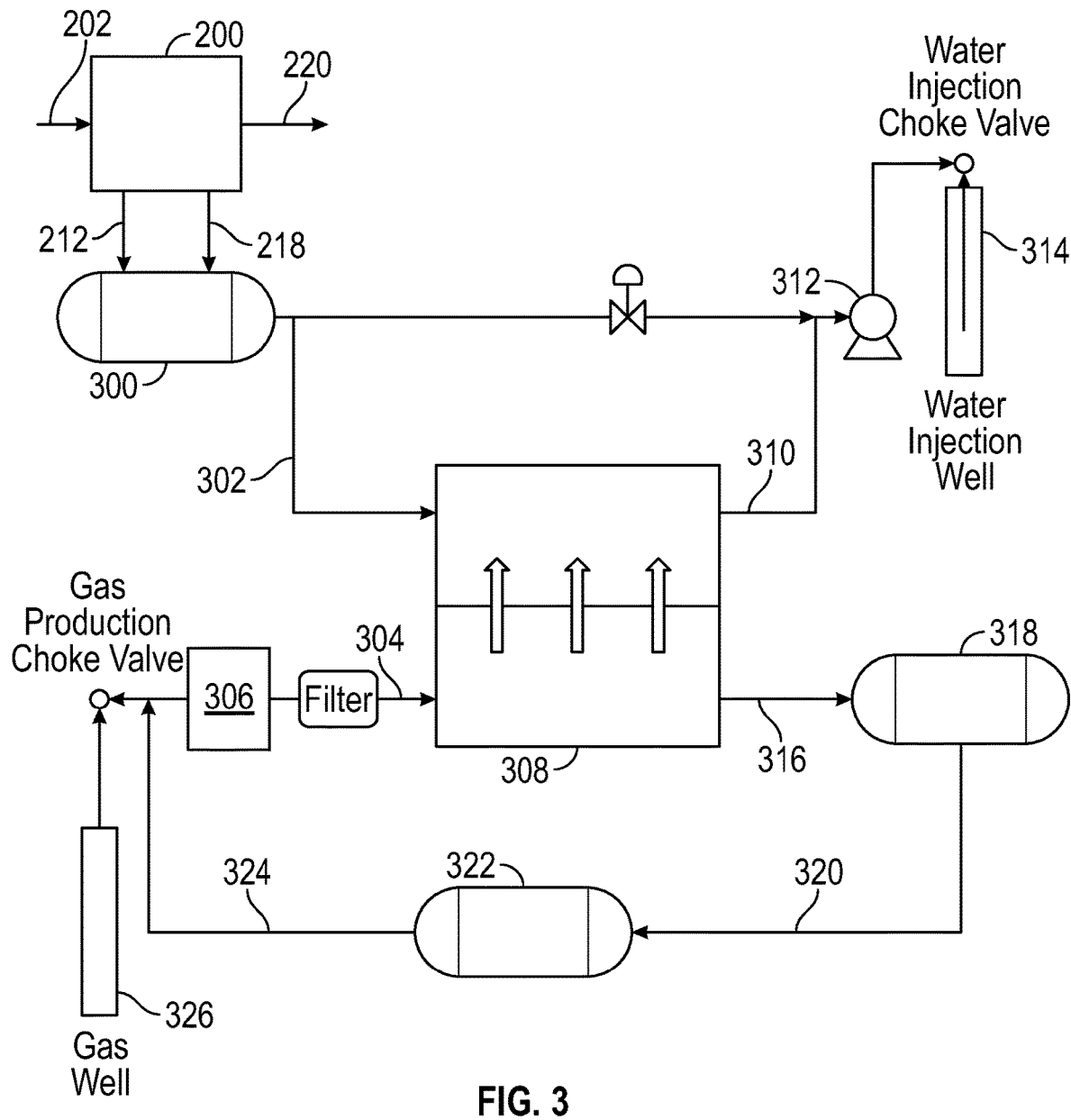
FIG. 3 illustrates a system and method for concentration of kinetic hydrate inhibitors (KHIs) using vibrationally assisted forward osmosis and produced water as a draw solution in accordance with one or more embodiments of the present invention.

(2) Specific Details of Various Embodiments of the Invention (2.1) Concentration and Extraction of KHI Using Vibrationally Assisted Forward Osmosis and Produced Water as Draw Solution FIG. 3 is a schematic diagram showing concentration and extraction of KHI using vibrationally assisted forward osmosis and produced water as a draw solution according to one or more embodiments of the present disclosure. The produced water (212 and 218) is collected from the various GOSP equipment and then treated in a water oil separation plant (WOSEP) (300) to remove oil content to less than 100 ppm. The treated produced water is used as a draw solution (302) to concentrate and absorb the water from the feed solution (304) (i.e., water separated from a three-phase separator in a gas plant (306) then passed through a filter) using a forward osmosis (FO) unit (308), or FO chamber. The generated diluted draw solution (310) will be pumped by high pressure disposal water pumps (312) into the oil reservoir through at least one water injection well (314) for enhanced oil recovery. The concentrated feed solution (316) containing KHI will be collected in a KHI and chemical storage unit (318). The KHI (320) is collected and shipped back offshore and collected in a KHI storage unit (322) where it is mixed with the KHI makeup (KHI and CI). The mixture (324) is then injected into a gas well (326).

In one or more embodiments, the KHI formulation can be composed of one or more types of polymers, such as water-soluble and synthetic polymers. For example, KHI polymers can include, but are not limited to, synthetic polymers that are water miscible such as polyvinylcaprolactam (PVCap). KHI polymers can be organic, water miscible, or both. Additional example KHI polymers can include, for instance, one or more of the following polymers or combinations or derivatives thereof: poly(vinylcaprolactam) (PVCap); polyvinylpyrrolidone; poly(vinylvalerolactam); poly(vinylazacyclooctanone); co-polymers of vinylpyrrolidone and vinylcaprolactam; poly(N-methyl-N-vinylacetamide); copolymers of N-methyl-N-vinylacetamide and acryloyl piperidine; co-polymers of N-methyl-N-vinylacetamide and isopropyl methacrylamide; co-polymers of N-methyl-N-vinyl acetamide and methacryloyl pyrrolidine; co-polymers of acryloyl pyrrolidine and N-methyl-N-vinylacetamide; acrylamide/maleimide co-polymers such as dimethylacrylamide (DMAM) copolymerized with, for example, maleimide (ME), ethyl maleimide (EME), propyl maleimide (PME), or butyl maleimide (BME); acrylamide/maleimide co-polymers such as DMAM/methyl maleimide (DMAM/MME) and DMAM/cyclohexyl maleimide (DMAM/CHME); N-vinyl amide/maleimide co-polymers such as N-methyl-Nvinylacetamide/ethyl maleimide (VIMAlEME); lactam maleimide co-polymers such as vinylcaprolactam ethylmaleimide (VCap/EME); polyvinyl alcohols; polyamines; polycaprolactams; or polymers or co-polymers of maleimides or acrylamides.

(2.2) Model Predictive Control for the KHI Recovery Process

Figure 4:
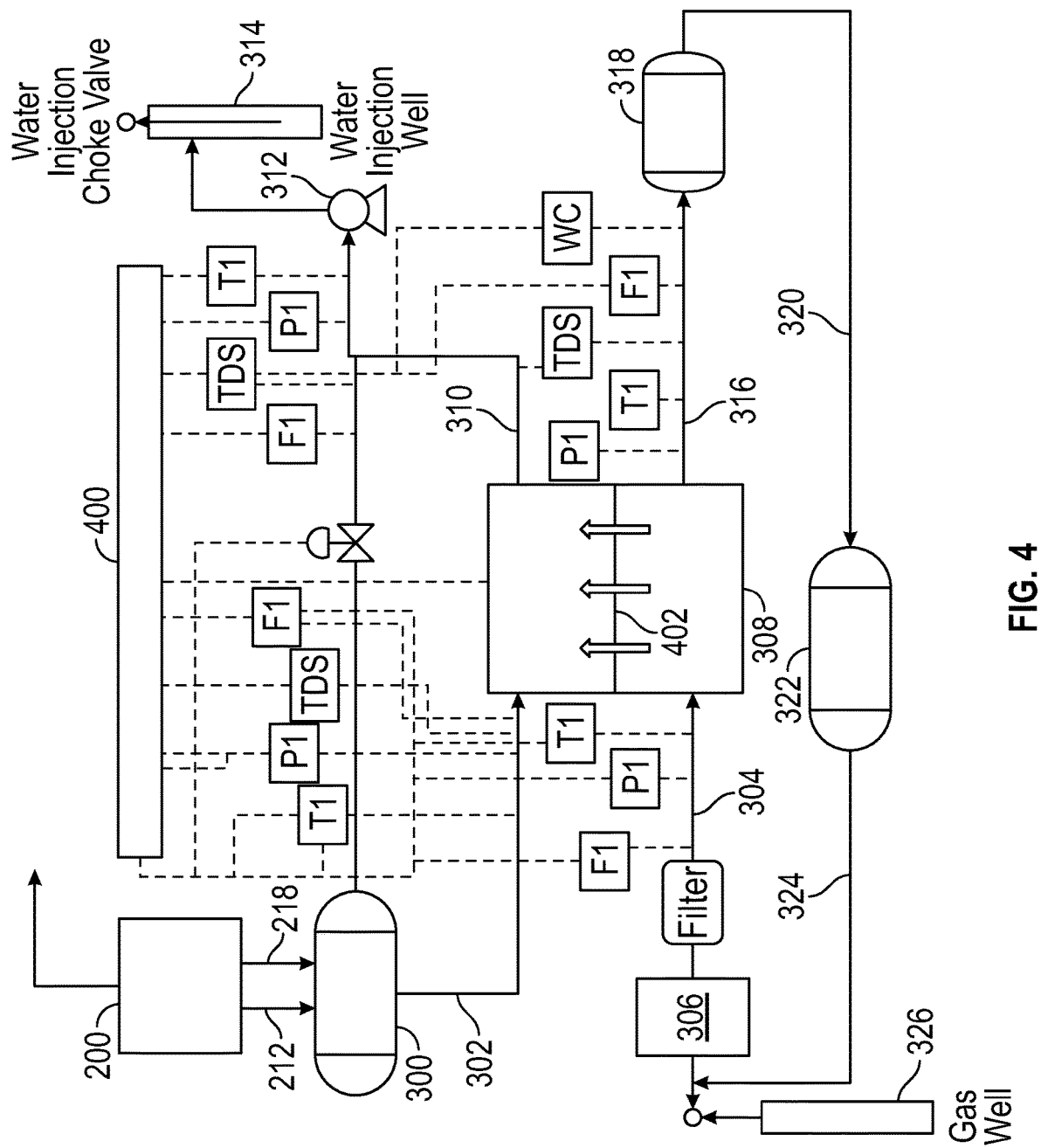
FIG. 4 illustrates a system and method for model predictive control for KHI recovery in accordance with one or more embodiments of the present invention.

FIG. 4 is a schematic diagram of model predictive control (MPC) for the KHI recovery process according to embodiments of the present disclosure. Model predictive controllers (MPCs) (400) are used to control a process while satisfying a set of constraints. MPCs (400) rely on dynamic models of a process and are able to predict future events and take control actions in accordance with the predictions. In one embodiment, the MPCs (400) are implemented as digital controllers. In the invention described herein, the objection function of the MPCs (400) is maximizing the recovery of the KHI while minimizing the water content in the KHI stream (320) to the KHI storage unit (322).

The MPCs (400) are operable to adjust operating parameters in response to information provided by online composition analyzers which are configured to measure and assess a variety of parameters. The following are processes that can be controlled by the MPCs (400). In one embodiment, the total dissolved solids (TDS) of the concentrated feed solution (316), as assessed by composition analyzers (e.g., online composition analyzers), can be utilized to monitor any ingress of salts from the draw solution (310). In another embodiment, the TDS across the FO membrane (element 402) for both the draw solution (302) and feed solution (304) can be monitored to measure the performance of the FO unit (308). In yet another embodiment, water concentration (WC) in the concentrated solution from the FO unit (308) can be utilized to monitor the performance of the FO unit (308) by increasing or decreasing the flow of the draw solution (310) to the FO unit (308). WC can also be utilized to measure the chemical concentration.

In one or more embodiments, the MPCs (400) are part of a closed loop control system. In general, a control loop system monitors and regulates devices, instrumentation, and machines used in industrial or manufacturing processes. In a control loop system, process variables are programmable parameters that monitor and control a process to ensure the output is maintained within a predetermined range or limit. Manipulated variables are parameters that are adjusted to bring the process back to a desired setpoint.

In embodiments of this disclosure a closed loop controller (i.e., MPCs) in a distributed control system (DCS) is configured where a process variable may include a minimum TDS of the concentrated KHI feed solution (304) from the FO unit (308). Additionally, a process variable may be a minimum water volume in the concentrated KHI solution from the FO unit. The manipulated variables may include one or more of the following: a feed solution temperature (T1), pressure (P1), or flow (F1); a draw solution TDS, temperature, pressure, or flow; a concentrated solution TDS, temperature, pressure, flow, or water concentration (WC); and a diluted draw solution TDS, temperature, or flow and a flow control valve (FCV) opening. MPC control of manipulated variables is represented by dashed lines in each of the figures depicting MCP control.

Prediction models for the above process variables may be generated using a mechanistic model or experimentally during or by using artificial intelligence of the historical data. In one or more embodiments, the models may be generated using step response model methodology during operation by quickly changing each input process variable and measuring the change on the output variables. The MPCs (400) will be used to maximize KHI and the recovery of other chemicals with low water concentration. The MPCs (400) will also be utilized to predict the performance of a forward osmosis unit and arrange accordingly for planned maintenance of the FO unit to recover performance loss of KM recovery.

Figure 5:
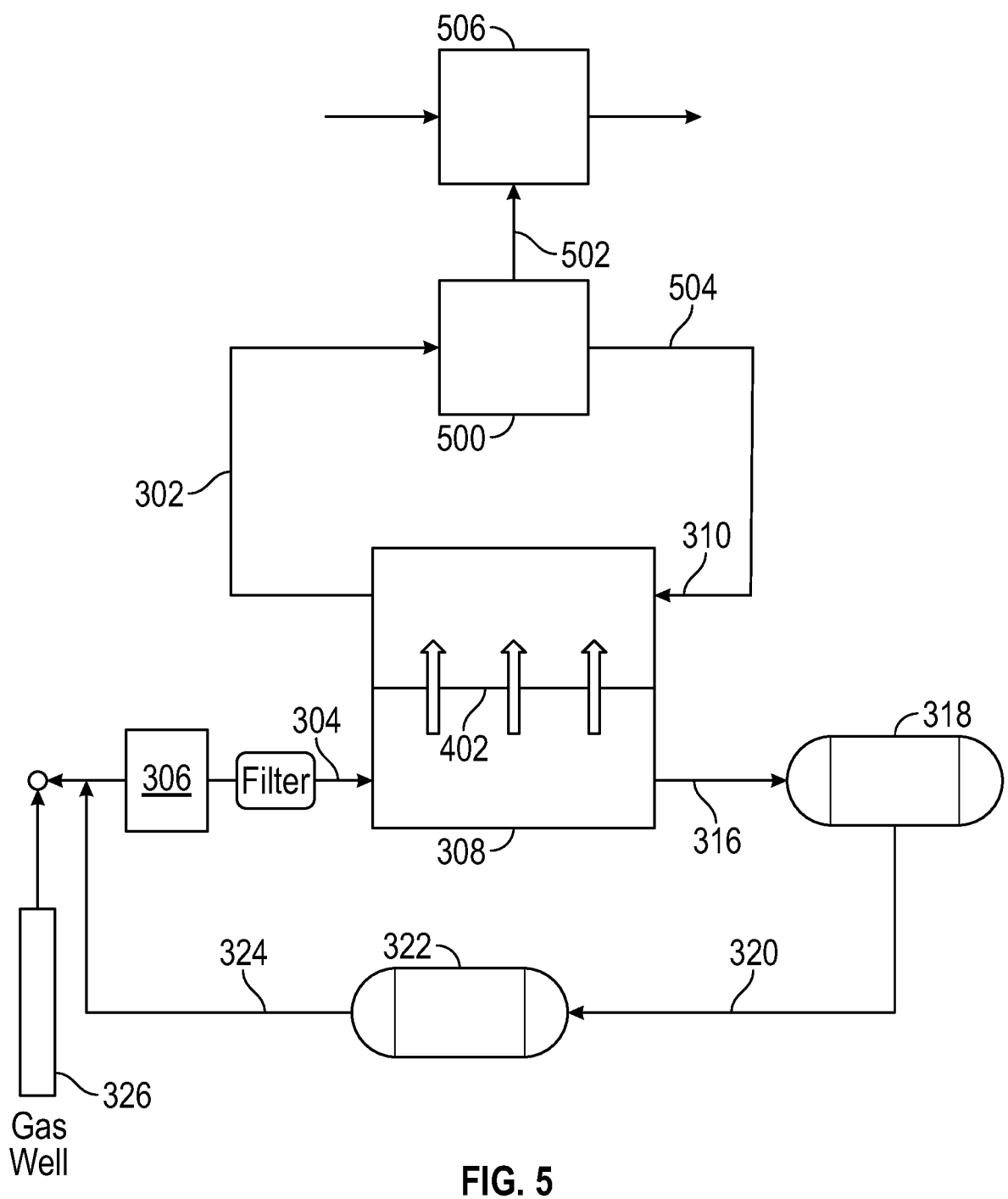
FIG. 5 illustrates a system and method for concentration and extraction of KHI using forward osmosis and regenerated draw solution in accordance with one or more embodiments of the present invention.

(2.3) Concentration and Extraction of KHI Using Forward Osmosis and Regenerated Draw Solution In the absence of high osmotic pressure produced water in the plant, a draw solution may be used and regenerated in a closed circuit, as shown in the embodiment depicted in FIG. 5. In this embodiment, the draw solution (302) is used to "attract" water from the feed solution (304) by an osmotic pressure difference through the semi-permeable membrane (402) in the FO unit (308), while most solutes are rejected by the FO membrane (402). This is followed by a regeneration process at a regeneration plant (500) to reconcentrate the diluted draw solution (310) and produce pure water. Typical draw solutions are either inorganic or organic. Non-limiting examples of inorganic draw solutions include KCl, $CaCl_2$, NaCl, $MgCl_2$, ammonia-carbon dioxide ($NH_4HCO_3$), and fertilizers. Non-limiting examples of organic draw solutions include switchable polarity solvents (SPSs). SPSs have a low polarity until exposed to a trigger, which changes them to a high polarity solvent. This trigger is often $CO_2$. $CO_2$ reacts with the molecule to produce a water-miscible form.

The regeneration process may occur via a thermal process by distillation to remove the water. Alternatively, the regeneration process may occur using reverse osmosis, nano-filtration membranes, or micro-filtration membranes. The selection and use of a suitable draw solute can greatly influence the efficiency and sustainability of FO operations. Typically, an ideal draw solute in FO for water production should have the desired properties of high osmotic pressure, minimal reverse solute diffusion, easy separation from water, economic feasibility, reusability, nontoxicity, and compatibility with FO membranes (402). In one or more embodiments, the draw solution (302) is a SPS.

In FIG. 5, the regenerated draw solution (504) is used to concentrate and absorb the water from the feed solution (304) (i.e., water separated from the three-phase separator in the gas plant (306) then passed through a filter) using the FO membranes (402). The generated diluted draw solution (302) will be recycled back to the regeneration plant (500) to remove the water and concentrate the draw solution. The concentrated draw solution (310) will be returned to the FO unit (308) to absorb the water from the KHI feed solution (304) and generate the concentrated feed solution (316). The generated water from the regenerator plant (500) may be used as wash water (502) in a crude desalting facility (506), or can be used for any other industrial purpose as utilities. The concentrated feed solution (304) containing KHI may be collected in a KHI and chemical storage unit (318), such as a three phase separator drum, where the KHI (320) is collected and shipped back to an offshore KHI storage unit (322) for reinjection after mixing with the KHI makeup.

(2.4) KHI Recovery Using Forward Osmosis, Chemical Injection, and Heating

In another embodiment, a process is provided to concentrate the KHI and gas field chemicals first followed by addition of an organic or inorganic compound to the concentrated solution and heating to enhance the separation of KHI. This embodiment is especially useful if 100% KHI concentration is desired. The concentration step will dramatically reduce the energy requirements, organic/inorganic compound consumption, and time required for the separation of the KHI and other gas field chemicals. Adding an organic or inorganic compound to a concentrated aqueous fluid containing KHI (i.e., concentrated feed solution 316) can cause separation of the KHI from the aqueous phase. The organic compound comprises a hydrophobic tail and a hydrophilic head. Higher molecular weight alcohols, such as butanol, have been found to be effective at displacing KHI. For example, Pentanol has a low degree of miscibility with water and excess pentanol results in separation into a pentanol rich phase and a water rich phase. The KHI is displaced from the water rich phase to the pentanol rich phase. Additionally, glycol ethers, such as ethylene glycol monoethyl ether and ethylene glycol monopropyl ether, are expected to be good organic compounds to cause a separation of the KHI from the aqueous phase.

Figure 6:
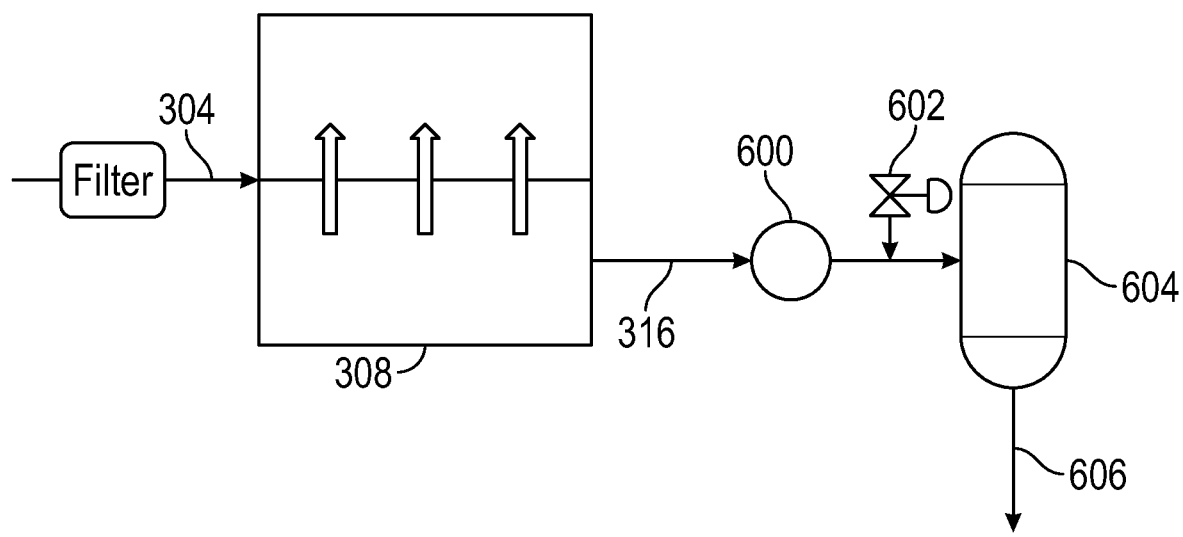
FIG. 6 illustrates a system and method for KHI concentration, inorganic or organic chemical addition, and heating to enhance KHI recovery in accordance with one or more embodiments of the present invention.

In FIG. 6, a heating step, implemented with a heater (600), is added after the forward osmosis process. The heating is followed by the addition of inorganic or organic compounds (602) to enhance the separation of the KHI.

In addition, gas flotation is introduced in this embodiment, forming a 3-phase KHI gas flotation separator (604) to enhance the hydrocarbon phase separation from the water. In gas flotation (e.g., induced gas flotation), small gas bubbles are introduced into the treatment process to remove the suspended matter, such as KHI, from the water. The removal is achieved by injecting gas bubbles into the wastewater in the three-phase separator (604). The bubbles may be also generated by an impeller, an agitator, or a sparger. The bubbles adhere to the suspended matter (e.g., KHI), causing the suspended matter to float to the top and separate. The free water (606) then exits the three-phase separators (604) for disposal.

Figure 7:
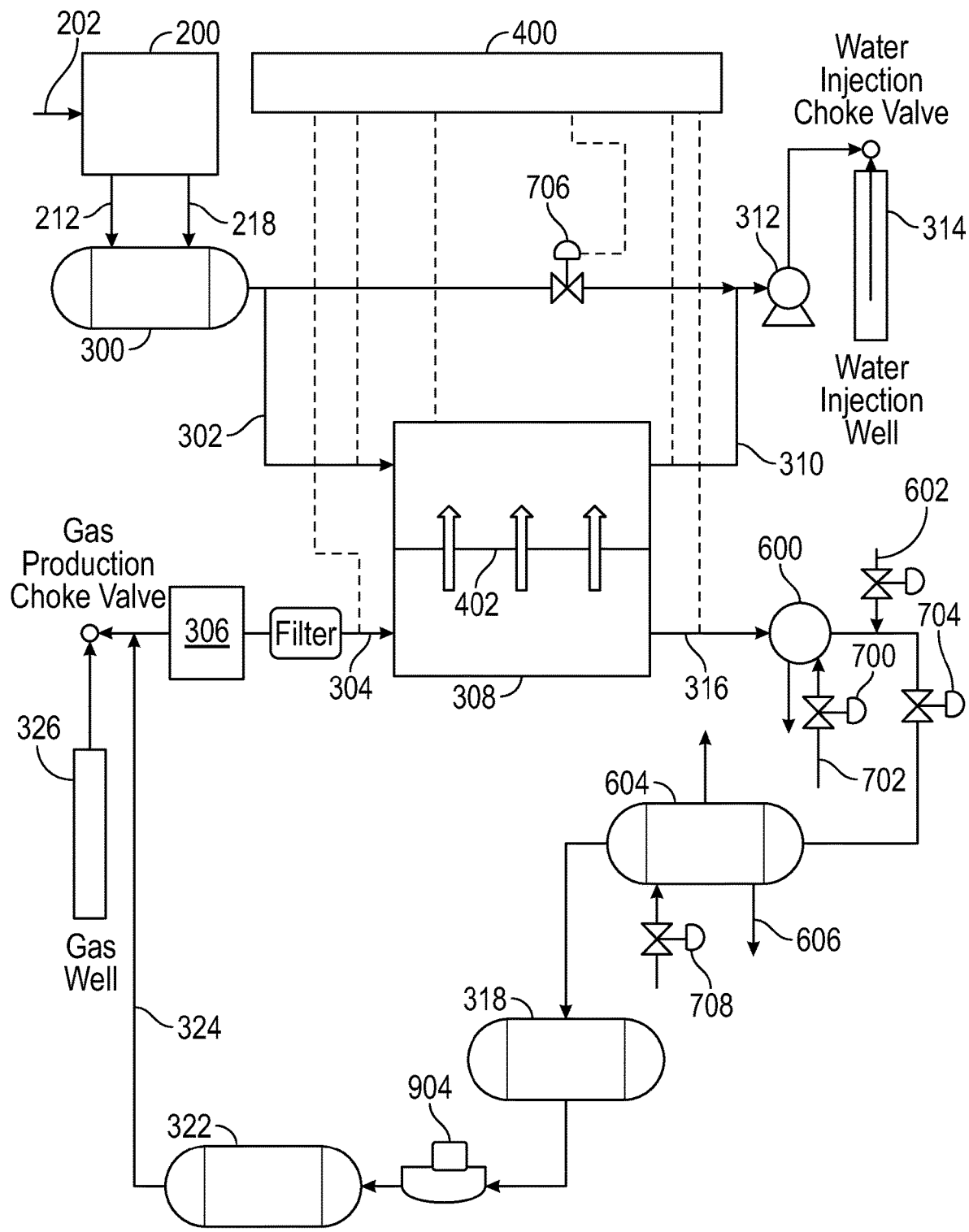
FIG. 7 illustrates a system and method for model predictive control for KHI concentration, inorganic or organic chemical addition, and heating to enhance KHI recovery in accordance with one or more embodiments of the present invention.

(2.5) Model Predictive Control for the KHI Concentration, Organic/Inorganic Chemical Addition, and Heating to Enhance KHI Recovery In yet another embodiment, KHI recovery is enhanced using a combination of model predictive controllers (MPCs), addition of organic/inorganic chemicals, and heating. This embodiment is illustrated in FIG. 7. The objective function of the MPCs (400) is to maximize the recovery of the KHI while minimizing the water content in the KHI stream to the storage. The following are processes that may be controlled by MPCs (400). The TDS of the concentrated feed solution (316) may be utilized to monitor any ingress of salts from the draw solution (302). Further, the TDS across the FO membrane (402) for both draw and feed stream inlet and outlet (302 and 304) may be monitored to measure and monitor to performance of the FO unit (308). Water concentration (WC) in the concentrated solution (316) from the FO unit (308) may be utilized to monitor the performance of the FO unit (308) by increasing or decreasing the flow of the draw solution (302) to the FO unit (308). Additionally, the WC may be utilized to measure the chemical concentration of added organic/inorganic compounds (602). An exchanger outlet temperature controller may be used to adjust an inlet heating media control valve (700) to adjust the temperature of the heating media (702). Finally, a KHI concentration analyzer may be utilized to adjust the organic/inorganic compound (602) flow, stream temperature, and mixing valve (704) pressure drop to meet required KHI concentrations.

In this embodiment, the process variables may include a minimum TDS of the concentrated KHI solution (316) from the FO unit (308). In addition, the process variable may include a minimum water (i.e., water concentration) in the concentrated KHI solution (316) from the FO unit and the free water (606) from the three-phase separator (604). In one or more aspects, the manipulated variables may include feed solution (304) temperature, pressure, and flow; draw solution (302) TDS, temperature, pressure, and flow; concentrated solution (316) TDS, temperature, pressure, flow, and water concentrations; diluted draw solution (310) TDS, temperature, pressure, and flow; flow control valve (FCV) (706) opening; differential pressure across mixing valves (704); gas flow to the gas flotation (708); organic/inorganic compound (602) flow used in enhancing separation; and heating media (702) flow.

Prediction models for the above process variables may be generated using a mechanistic model or by experiment during or by using the artificial intelligence of the historical data. MPCs (400) may be used to maximize KHI and other chemicals recovery with low water concentration. MPCs (400) may also be used to predict the performance of the FO unit (308) and arrange for planned maintenance of the FO unit (308) for performance recovery.

(2.6) KHI Concentration and Vacuum Separation

Figure 8:
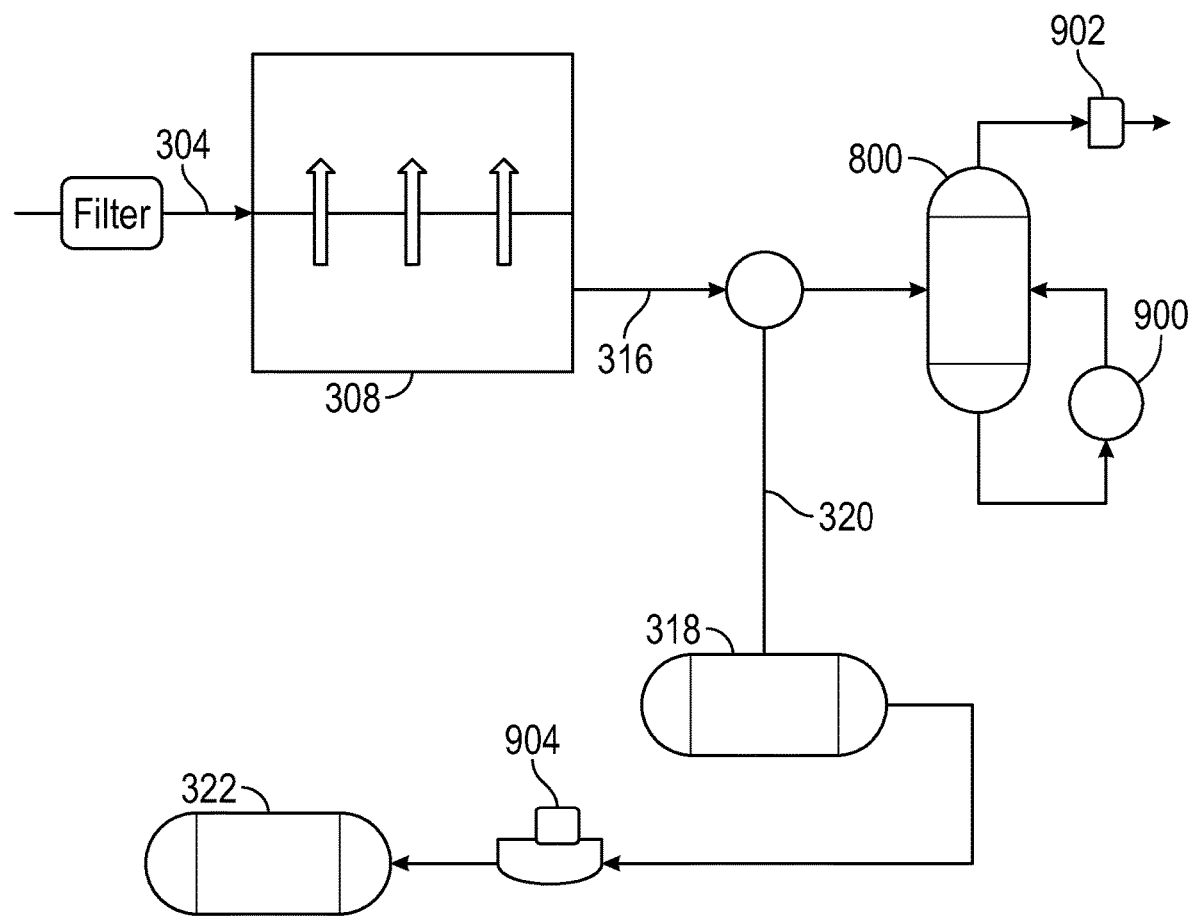
FIG. 8 illustrates a system and method for forward osmosis followed by vacuum distillation in accordance with one or more embodiments of the present invention.

In another embodiment, vacuum separation is incorporated, as illustrated in FIG. 8. This embodiment may be utilized to separate any remaining water or volatile component from the concentrated feed solution (316) containing KHI. The FO unit (308) is utilized as a concentration step to increase the concentration of KHI to reduce energy consumption followed by a vacuum distillation step using a vacuum component (800) (e.g., vacuum distillation column, vacuum separator). In one aspect, the concentrated KHI solution (316) is directed to vacuum distillation operating at 1.0 to 13.0 pounds per square inch absolute (psia) to reduce the operating temperature of KHI and avoid potential degradation.

(2.7) Model Predictive Control of Forward Osmosis and Vacuum Distillation

Figure 9:
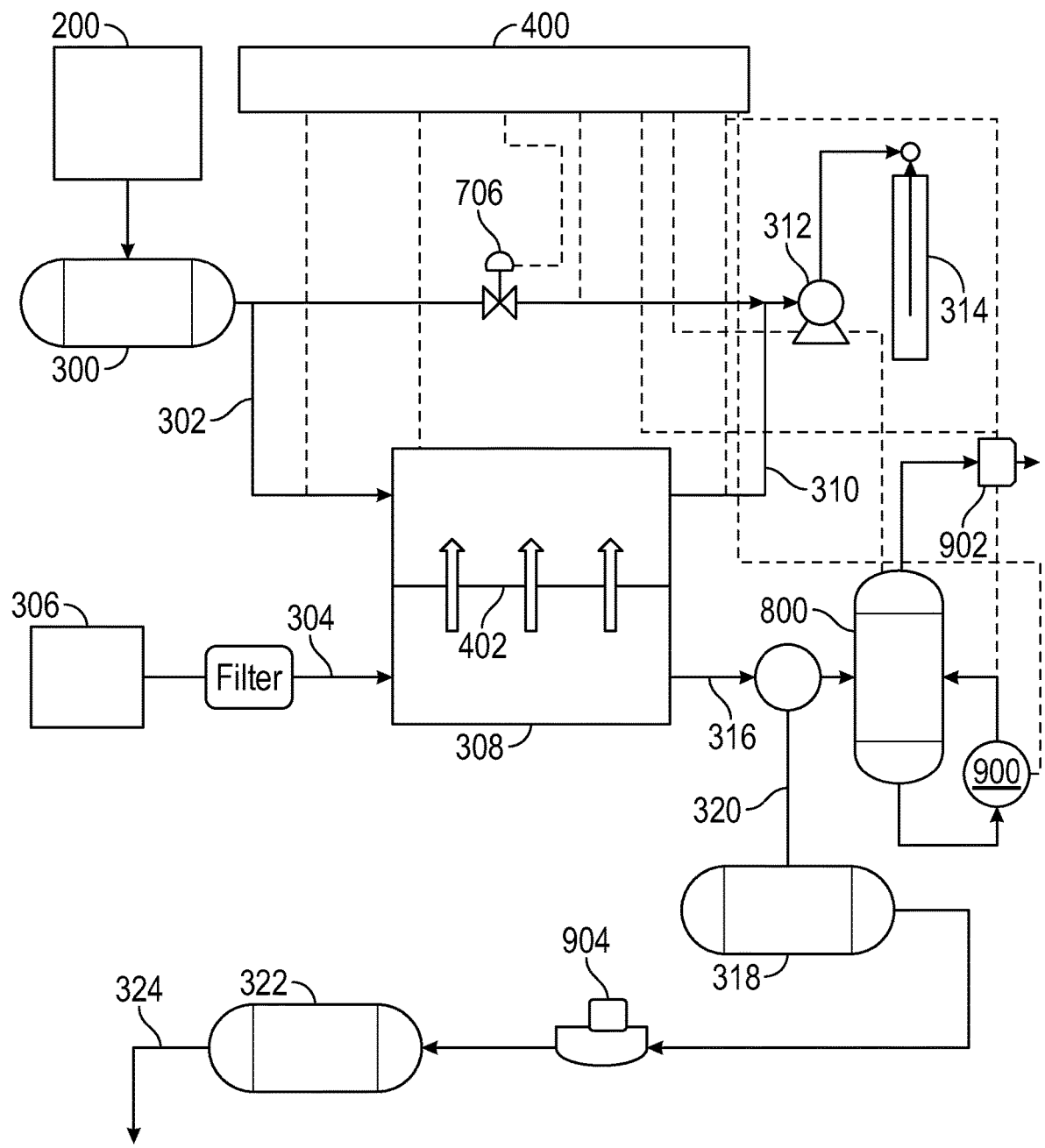
FIG. 9 illustrates a system and method for model predictive control of forward osmosis and vacuum distillation in accordance with one or more embodiments of the present invention.

In yet another embodiment, KHI recovery and concentration is enhanced using a combination of model predictive controllers (MPCs), forward osmosis, and vacuum distillation. This embodiment is illustrated in FIG. 9. The objective function of the MPCs (400) is to maximize the recovery of the KHI while minimizing the water content in the KHI stream to the storage. The concentrated feed solution (316) containing KHI will be collected in a KHI and chemical storage unit (318). The KHI (320) is collected and shipped back offshore via a chemical boat (904) and collected in a KHI storage unit (322) where it is mixed with the KHI makeup (KHI and CI). The mixture (324) is then injected into a gas well. The following are processes that may be controlled by MPCs (400). The TDS of the concentrated feed solution (316) may be utilized to monitor any ingress of salts from the draw solution (302). The TDS across the FO membrane (402) for both draw and feed stream inlet and outlet may be monitored to measure and monitor the performance to of the FO unit (308). Water concentration (WC) in the concentrated solution (316) from the FO unit (308) will be utilized to monitor the performance of the FO unit (308) by increasing or decreasing the flow of the draw solution (302) to the FO unit (308). Additionally, the WC may be utilized to measure the chemical concentration of added organic/inorganic compounds.

In this embodiment, the process variable may include a minimum TDS of the concentrated KHI solution (316) from the FO unit (308). Additionally, the process variable may be a minimum water concentration in the concentrated KHI solution (316) from the FO unit (308) and the vacuum component (800). In one or more aspects, the manipulated variables may include feed solution (304) temperature, pressure, and flow; draw solution (302) TDS, temperature, pressure, and flow; concentrated solution (316) TDS, temperature, pressure, flow, and water concentrations; diluted draw solution (310) TDS, temperature, pressure, and flow; flow control valve (FCV) (706) opening; reboiler (900) temperature; vacuum component (800) distillation pressure; and vacuum compressor (902) discharge temperature, pressure, and flow.

Prediction models for the above process variables may be generated using a mechanistic model or by experiment during or by using the artificial intelligence of the historical data. MPCs (400) may be used to maximize KHI and other chemicals recovery with low water concentration. MPCs (400) may also be used to predict the performance of the FO unit (308) and arrange for planned maintenance of the FO unit (308) for performance recovery.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for separating gas field chemicals from a feed stream, comprising:
    providing a forward osmosis chamber comprising a forward osmosis membrane;
    feeding a draw stream of high salinity produced water to the forward osmosis chamber;
    feeding the feed stream to the forward osmosis chamber, wherein the feed stream comprises condensed water vapor from a gas well containing kinetic hydrate inhibitor (KHI);
    osmotically separating pure water from the feed stream and obtaining a concentrated feed stream of KHI from the forward osmosis chamber; and
    obtaining a diluted draw stream of produced water from the forward osmosis chamber.

2. The method as set forth in claim 1, further comprising:
    shipping the concentrated feed stream of KHI offshore;
    collecting the concentrated feed stream of KHI in a storage unit;
    mixing the concentrated feed stream of KHI with one or more additional chemicals; and
    injecting the mixture into a gas well.

3. The method as set forth in claim 1, wherein the forward osmosis membrane is a vibrationally assisted forward osmosis membrane.

4. The method as set forth in claim 1, further comprising:
heating the concentrated feed stream of KHI; and
following heating, adding an inorganic or organic compound to the concentrated feed stream of KHI, thereby enhancing separation of KHI.

5. The method as set forth in claim 1, further comprising:
directing the concentrated feed stream of KHI to a vacuum component; and
performing vacuum distillation on the concentrated feed stream of KHI, thereby enhancing KHI separation.

6. The method as set forth in claim 1, further comprising:
reconcentrating the diluted draw stream of produced water via a regenerating process, thereby producing a concentrated draw solution; and
returning the concentrated draw solution to the forward osmosis chamber.

7. The method as set forth in claim 1, further comprising utilizing at least one model predictive controller for KHI recovery, wherein the at least one model predictive controller is operable for adjusting a plurality of operating parameters in order to maximize KHI recovery while minimizing water content in the concentrated feed stream of KHI.

8. The method as set forth in claim 7, wherein the plurality of operating parameters comprises at least one of a temperature, pressure, flow, and total dissolved solids of the feed stream.

9. The method as set forth in claim 7, wherein the plurality of operating parameters comprises at least one of a temperature, pressure, flow, and total dissolved solids of the draw stream.

10. The method as set forth in claim 7, wherein the plurality of operating parameters comprises at least one of a temperature, pressure, flow, and total dissolved solids of the concentrated feed stream of KHI.

11. The method as set forth in claim 7, wherein the plurality of operating parameters comprises at least one of a temperature, pressure, flow, and total dissolved solids of the diluted draw stream of produced water.

12. The method as set forth in claim 1, further comprising:
heating the concentrated feed stream of KHI;
directing the heated concentrated feed stream of KHI to a gas flotation separator to remove KHI from the concentrated feed stream through injection of gas bubbles, such that gas bubbles adhere to the KHI, causing the KHI to float and separate from the resulting free water.

13. A method for concentration and extraction of gas field chemicals, comprising:
collecting produced water from a gas oil separation plant;
treating the produced water in a water oil separation plant to remove oil;
receiving a feed solution passed through a three-phase separator and a filter, the feed solution comprising a gas field chemical and water;
using the treated produced water as a draw solution, concentrating and absorbing water from the feed solution using a forward osmosis chamber, thereby producing a concentrated feed solution containing the gas field chemical and a diluted draw solution;
extracting the concentrated feed solution containing the gas field chemical;
shipping the concentrated feed solution containing the gas field chemical offshore;
storing the concentrated feed solution containing the gas field chemical in a storage unit;
mixing the concentrated feed solution containing the gas field chemical with one or more additional chemicals; and
injecting the mixture into a gas well.

14. The method as set forth in claim 13, further comprising pumping the diluted draw solution into an oil reservoir through at least one water injection well for enhanced oil recovery.

15. A system for concentration and extraction of gas field chemicals, comprising:
a gas oil separation plant configured for producing water from a crude feed;
a water oil separation plant configured for removing oil from the produced water;
a three-phase separator and a filter for configured for producing a feed solution comprising a gas field chemical and water;
a forward osmosis chamber configured for concentrating and absorbing water from the feed solution using the treated produced water as a draw solution, thereby producing a concentrated feed solution containing the gas field chemical;
a chemical storage unit for storing the concentrated feed solution containing the gas field chemical; and
at least one model predictive controller operable for adjusting a plurality of operating parameters to maximize recovery of the gas field chemical.

16. The system as set forth in claim 15, further comprising a vacuum component configured for performing vacuum distillation on the concentrated feed solution containing the gas field chemical.

17. The system as set forth in claim 15 further comprising:
a heater configured for heating the concentrated feed solution containing the gas field chemical; and
a gas floatation separator configured to remove the gas field chemical from the concentrated feed solution.

* * * * *